United States Patent [19]

Losee

[11] 4,085,627

[45] Apr. 25, 1978

[54] ELLIPTICAL FLYWHEEL APPARATUS

[75] Inventor: Jon R. Losee, San Diego, Calif.

[73] Assignee: The United States of America as represented by the Secretary of the Navy, Washington, D.C.

[21] Appl. No.: 707,583

[22] Filed: Jul. 22, 1976

[51] Int. Cl.² .................. F16F 15/10; F16H 33/02
[52] U.S. Cl. ............................................. 74/574
[58] Field of Search .................. 74/572, 573 R, 574;
180/54 R; 280/217; 310/74; 123/192 R, 192 B

[56] References Cited

U.S. PATENT DOCUMENTS

| 3,964,341 | 6/1976 | Rabenhorst | 74/573 R |
| 4,036,080 | 7/1977 | Friedericy | 74/572 |

OTHER PUBLICATIONS

A.P.C. Application of Salomon, Ser. No. 177,226, Published June 1, 1943.

Primary Examiner—Carlton R. Croyle
Assistant Examiner—Leonard E. Smith
Attorney, Agent, or Firm—Richard S. Sciascia; Ervin F. Johnston

[57] ABSTRACT

A flywheel apparatus which includes a pair of radially extending diametrically opposed spokes with a rim mounted thereon. The rim is elliptical with the major axis being substantially coextensive with the longitudinal axis of the spokes. The difference in length between the major and minor axes is such that when the flywheel is at full speed the rim is substantially circular. With this arrangement contact and low stress are maintained between the rim and the spokes when the flywheel apparatus is at full speed.

4 Claims, 3 Drawing Figures

ELLIPTICAL FLYWHEEL APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

High energy flywheels have potential use in automobiles, homes, or water vehicles. A high energy flywheel would enable the use of a smaller power plant with the flywheel being utilized for supplying the extra energy required for acceleration.

The rim flywheel is traditionally used because of its high energy storage per pound per revolution. This is due to the high moment of inertia caused by a concentration of mass at the outside of the rim flywheel. However, rim flywheels have limitations in their energy storage because of a severe stress concentration at the spoke/rim interface. This is caused by a much greater rim strain in contrast to the spoke strain at high speed.

Multiconcentric rim flywheels have been proposed, however there is a serious drawback to their structural integrity. As the speed of the multiconcentric rim flywheel is increased, the outer rim or rims are subjected to higher stresses for a given material density, causing them to expand more than the inner rims. With increased speed the outer rims grow free from the inner rims creating a balance problem as well as containment problems.

SUMMARY OF THE INVENTION

There is a need for a high energy flywheel which does not have the disadvantage associated with present rim flywheels wherein severe stress concentrations occur at the spoke/rim interface during high speeds. The present invention satisfies such a requirement.

The present invention includes a pair of radially extending diametrically opposed spokes with a rim mounted thereon. The rim is elliptical with the major axis being substantially coextensive with the longitudinal axis of the spokes. The difference in length between the major and minor axes of the rim is such that when the flywheel apparatus is at full speed the rim is substantially circular. With this arrangement contact and low stress are maintained between the rim and the spokes at high speed.

The invention further includes the rim constructed of a filament which is wound about the spokes. By utilizing a filament as contrasted to multiconcentric rings the problem of the outer rings growing away from the inner rings at high speeds is eliminated. With this arrangement the present invention can attain a higher speed with substantial safety.

OBJECTS OF THE INVENTION

An object of the present invention is to provide a flywheel apparatus which overcomes the aforementioned problems associated with prior art flywheels.

Another object is to provide a high energy flywheel apparatus which has a minimum of stress concentration at the spoke/rim interface.

A further object is to provide a flywheel apparatus which can operate at speeds above critical with substantial safety.

These and other objects of the invention will become more readily apparent from the ensuing specification when taken together with the drawing.

DESCRIPTION OF THE PREFERRED EMBODIMENT

Figure 1:
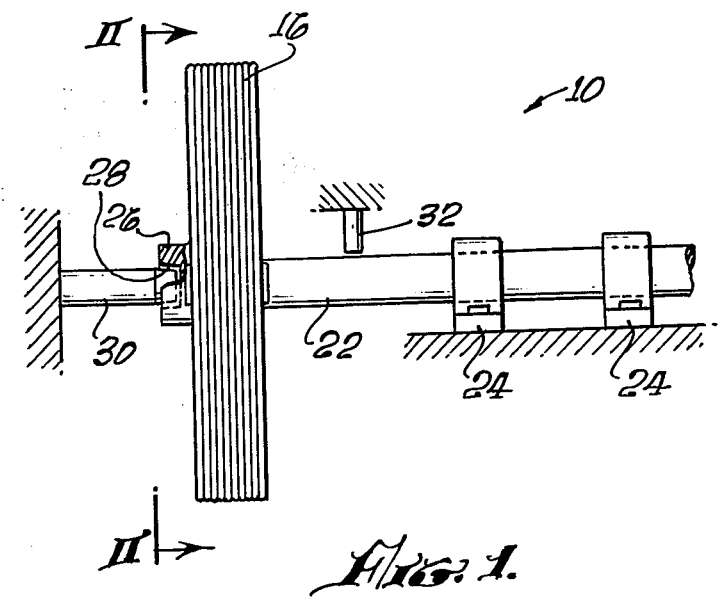
FIG. 1 is a side view of the flywheel apparatus.

Referring now to the drawing there is illustrated in FIG. 1 a flywheel apparatus 10 which includes a pair of radially extending diametrically opposed spokes 12 (see FIG. 2) which may be mounted on a hub 14. Mounted about the spokes 12 is a rim 16. The rim 16 is elliptical with the major axis being substantially coextensive with the longitudinal axis of the spokes when the flywheel apparatus is at zero speed (see FIG. 2). The difference in length between the major and minor axes of the rim is such that when the flywheel apparatus is at full speed (FIG. 3) the rim 16 is substantially circular. With this arrangement contact and low stress concentration are obtained at the spoke/rim interface 18 when the flywheel apparatus is at full speed. If desired, additional spokes may be utilized provided the rim is elliptical at zero speed.

The development of spoke radial change and L rim radial change are set forth below.

The stress in the spoke as a function of $r$ along the spoke is given by:

$$S(r) = \frac{\rho \omega^2}{2} (R^2 - r^2)$$

where:
$r$ = radial variable
$\rho$ = material density
$\omega$ = rotational speed radians/sec
R = Radius of spoke The radial stretch of the spoke, assuming it is small compared to the spoke radius, is given by:

$$\Delta R_s = \int_0^R \frac{S(r) dr}{E}$$

$$\Delta R_s = \frac{1}{3} \frac{\rho \omega^2 R^3}{E}$$

where:
$\Delta R_s$ = radial stretch
E = modulus of elasticity

In regard to the rim:

$$S_H = \rho R^2 \omega^2$$

$$\Delta C_{circ} = S_H L/E = S_H^2 \pi R/E = \rho R^2 \omega^2 2\pi R/E$$

$$\Delta R_R = \Delta C/2\pi = \rho R^3 \omega^2 / E$$

where:
$S_H$ = Hoop stress
$\Delta C_{circ}$ = Stretch in hoop
$\Delta R_R$ = Effective Stretch in radius The ratio of rim to spoke radial changes, assuming equal elasticity and density of the spoke and rim, is:

$$(\Delta R_R / \Delta R_s) = 3$$

Let δ be the difference between the semi-major axis R, and the semi-minor axis, R-δ, of an ellipse. Assuming δ is much smaller than R and using the above ratio:

$$\delta = 4\Delta R_s, \text{ or,}$$

$$\delta = 4/3 \, \rho \, R^3 \omega^2 / E$$

In the preferred embodiment the flywheel apparatus 10 may further include the rim 16 comprising a filament which is wound about the spokes 12. It has been found highly satisfactory to utilize Kevlar 49 yarn made by Dupont for the filament. This yarn can be provided with a tensile strength of about 375,000 psi and a modulus of elasticity of about $19 \times 10^6$ psi. In securing the yarn, the spokes 12 may be tubular, and the bitter ends of the yarn may be extended through the spokes and the hub 14 to fasteners 20. A significant and very unique advantage of Kevlar yarn filament is that should the yarn break under high speed the yarn will unravel and stop the flywheel without the danger of fragments or shrapnel flying against people and the surrounding structure.

The flywheel apparatus may further include a shaft 22, with the hub 14, spokes 12, and rim 16 being rigidly mounted on the shaft 22 for unitary rotation.

It is preferred that the shaft 22 extend from one side of the spokes 12 and that means rotatably support only this shaft extension so that the spokes 12 and rim 16 are cantilevered to take advantage of dynamic balancing when the flywheel is run above its critical speed. The cantilevered means of support allows for a lower critical speed than could be obtained by supporting the shaft on both sides of the flywheel. This supporting means may include a pair of roller bearings 24. The hub may be axially extended opposite from the shaft 22 to provide a boss 26. The boss 26 may be provided with an annular recess 28 which is coextensive with the shaft 22. A cylindrical projection 30 may be mounted for extension within the recess 28 and may have a diameter which is slightly smaller than the recess so that vibrations which occur at and near the critical speed, of the spokes 12 and rim 16, which occur at and near the critical speed, can be damped by contact of the projection 30 and the boss 26 within the recess 28. If desired, a resilient rod 32 may be mounted perpendicular to and in a spaced relationship from the shaft 22 for dampening vibrations of the shaft.

OPERATION OF THE INVENTION

Figure 2:
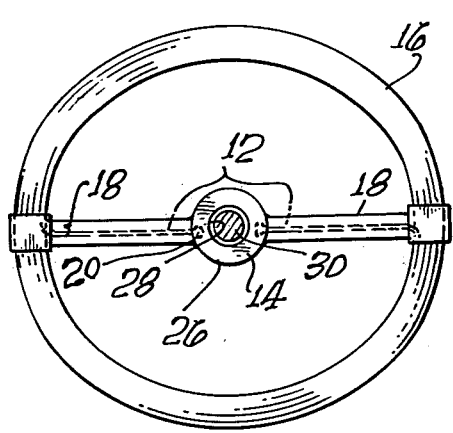
FIG. 2 is a view taken along plane II—II of FIG. 1 at zero speed.
Figure 3:
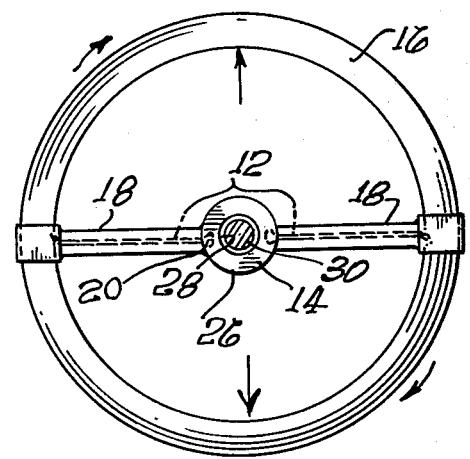
FIG. 3 is a view similar to FIG. 2 except the flywheel apparatus is at full speed.

In utilizing the flywheel apparatus 10 the flywheel may be brought up to a speed above critical which may be as high as 200,000 to 300,000 rpms. In the static condition the flywheel apparatus 10 has an elliptical shape as illustrated in FIG. 2. When the flywheel is brought up to operational speed the rim 16 assumes a circular shape as illustrated in FIG. 3. It can be visualized from FIGS. 2 and 3 that as the flywheel is brought from a static condition up to operational speed the rim 16 between the spokes 12 expands outwardly towards a circular shape. As this occurs, engagement is forced between the flywheel and the outward ends of the spokes 12 to maintain contact therebetween. Further, stress concentration at these points will be low. It is only after the flywheel is taken beyond its operational speed that the rim 16 would grow away from the spokes 12. Accordingly, the present invention overcomes the problems of maintaining contact and high stress concentrations of the rim flywheel, and yet enables extremely high speeds with substantial safety.

Obviously, many modifications and variations of the present invention are possible in the light of the above teachings, and, it is therefore understood that within the scope of the disclosed inventive concept, the invention may be practiced otherwise than specifically described.

What is claimed is:

1. A flywheel apparatus comprising:
   a pair of radially extending diametrically opposed spokes;
   a rim mounted on said spokes;
   said rim being elliptical with the major axis being substantially coextensive with the longitudinal axes of the spokes;
   the difference in length between the major and minor axes being such that when the flywheel apparatus is at full speed the rim is substantially circular and contact is maintained between the rim and the spokes;
   a shaft;
   said spokes and rim being rigidly mounted on the shaft for unitary rotation;
   the shaft extending from one side of the spokes;
   means rotatably supporting only said extension of the shaft so that the spokes and rim are cantilevered for rotation;
   a boss centrally mounted on the spokes on a side opposite said shaft;
   said boss having an annular recess which is coextensive with the shaft; and
   a cylinder mounted for extension within said recess and having a diameter which is smaller than the recess so that vibrations of the spokes and rim can be damped by contact of the cylinder and the boss within the recess.

2. An apparatus as claimed in claim 1 including:
   a resilient rod mounted perpendicular to and in a spaced relationship from said shaft extension for dampening vibrations of the shaft extension.

3. An apparatus as claimed in claim 2 including:
   said rim comprising a filament which is wound about said spokes.

4. An apparatus as claimed in claim 3 including:
   said filament being Kevlar yarn.

* * * * *